Patented Feb. 12, 1935

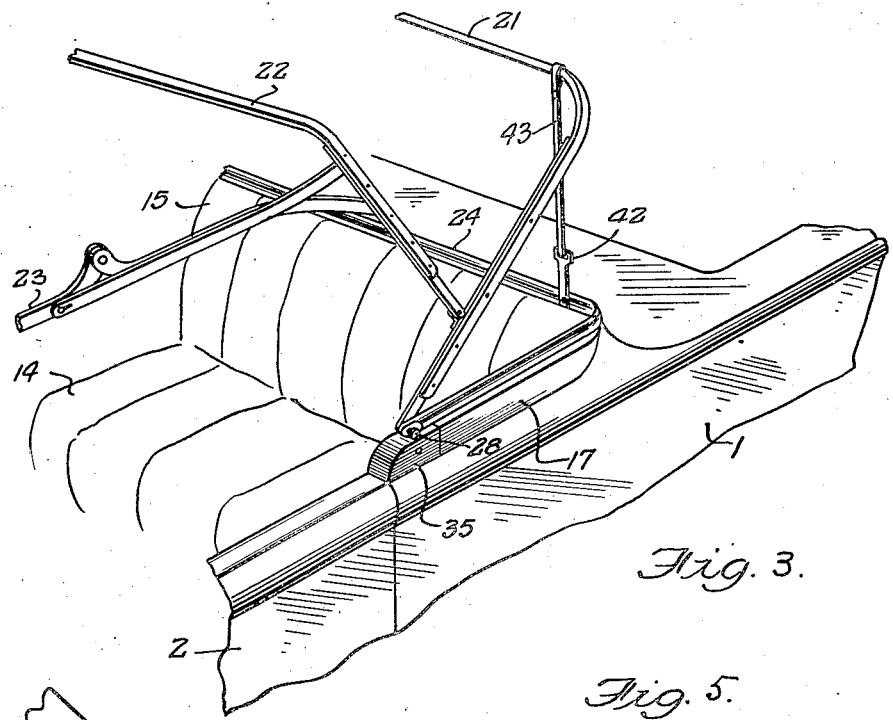
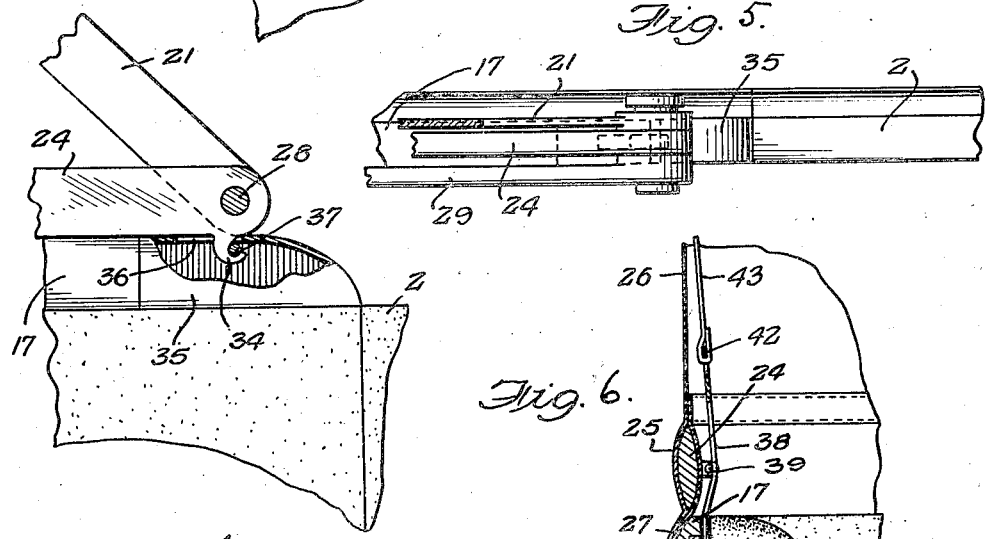

1,990,848

UNITED STATES PATENT OFFICE 1,990,848

DISAPPEARING AUTOMOBILE TOP

Anthony C. Velo, Asbury Park, N. J.

Application December 15, 1930, Serial No. 502,550

7 Claims. (Cl. 296—107)

This invention relates to a disappearing top for automobiles, and its main object is to provide novel means for mounting a folding top upon an automobile body and securing it in operative position thereon, and novel means for its reception in the automobile body, whereby a type of disappearing top may be furnished which may be easily and conveniently unfolded and disposed in position for use and as easily and conveniently folded and let down into the body so as to be substantially or entirely concealed from view when its use is not desired or required.

A further object of the invention is to provide a disappearing top for a touring car or other like open car which may be folded and stored in a compact manner in the car.

A still further object of the invention is to provide a disappearing top for a roadster, coupe or like vehicle having a rear storage or rumble seat compartment which, when in folded and let down condition, will be disposed in said compartment in a compact manner and in such manner as not to interfere with the normal use of such compartment.

A still further object of the invention is to provide a construction whereby an entranceway to the said storage or rumble seat compartment is adapted to be normally closed by the seat back of the seat in the main forward or driver's compartment of the vehicle, which seat back is adapted to be swung forward to open or expose said entranceway to the rear compartment for the insertion or removal of the top and to be swung back to a normal position in which it closes said rear compartment and conceals the stored top from view, and in which a holder is provided to receive and engage the stored top and to maintain it from displacement in the storage compartment.

A still further object of the invention is to provide novel means for mounting the folding top for ready and convenient movements into and out of the storage compartment and for securing it firmly in its unfolded and operative position while permitting of its being released and folded and stored within a minimum period of time.

A still further object of the invention is to provide a folding top of the character described which may be handled by a single person from the interior of either side of the vehicle and without the necessity of the operator passing from one side to the opposite side of the vehicle in order to successively manipulate the top at the opposite sides.

A still further object of the invention is to provide means for properly weighting and holding the lower edge of the top cover down and for securing the same against upward movement without the employment of the usual button fasteners, and for closing the joint between the body and fabric of the top when the top is open to prevent entrance of snow, sleet or rainwater into the car through such joint.

The invention consists of the features of construction, combination, and arrangement of parts, hereinafter fully described and claimed, reference being had to the accompanying drawings, in which:—

Fig. 3 is a fragmentary perspective view of the vehicle showing parts of the frame of the top as they appear when the top is in use.

Fig. 4 is a view showing one of the arms of the lower rear frame bowl and its locking connection with the body.

Fig. 5 is a sectional plan view showing the arm of the lower rear frame bow and coacting parts at one side of the vehicle.

Fig. 6 is a vertical section through the tail deck and rear portion of the top, showing one of the rear locking devices, the mounting of the lower frame bow in the cover and the joint-closing flap.

Figure 1:
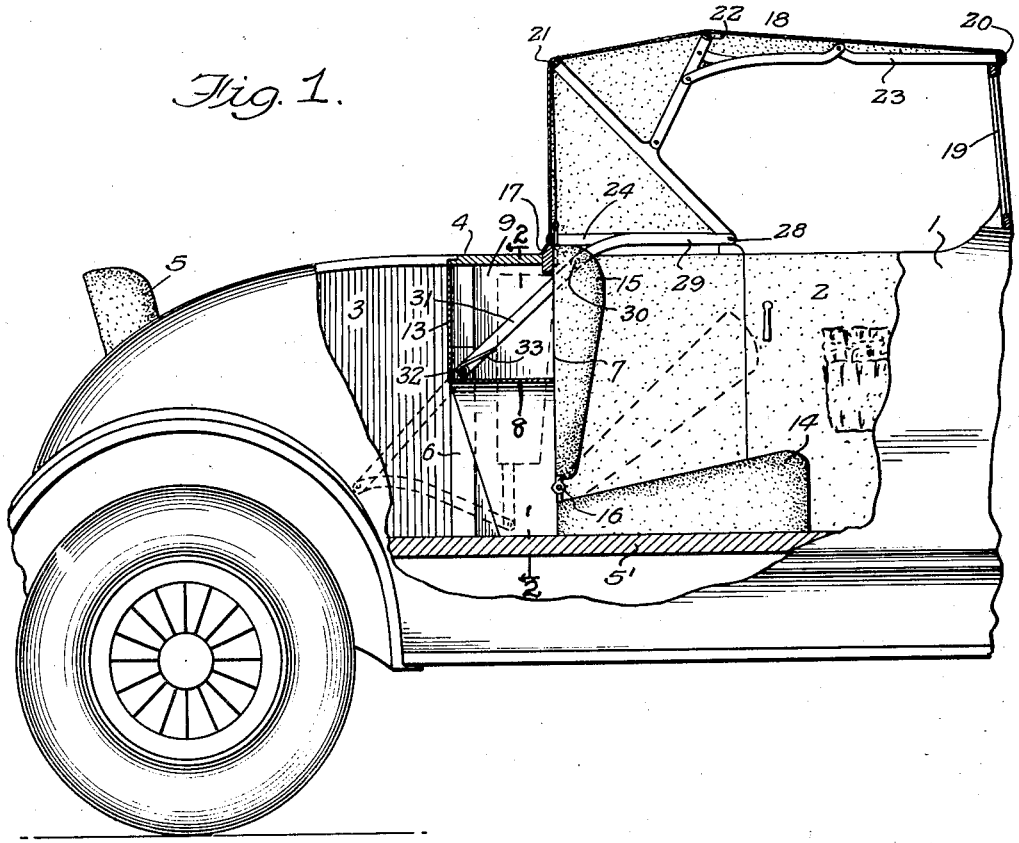
Fig. 1 is a fragmentary sectional side elevation of an automobile of the roadster type to which my invention is shown in the present instance applied, the top being respectively shown in its open and stored positions in full and dotted lines.
Figure 2:
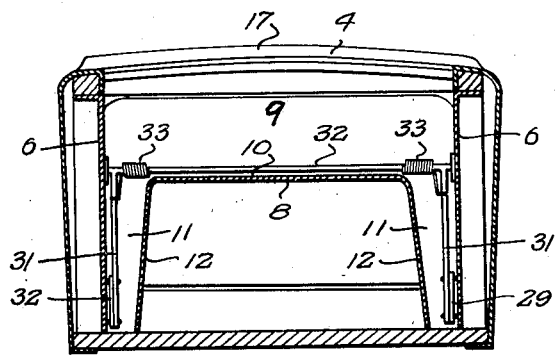
Fig. 2 is a cross-section on line 2—2 of Fig. 1.

Referring to the drawings, 1 designates the body of an automobile having a front compartment 2 for the driver and a passenger or passengers, if any, and a rear compartment 3 enclosed except at the front by the rear and side walls and tail deck 4 of the body, said compartments being provided with a common base or floor 5'. The compartment 3 may be provided, as usual, with an opening in its top, normally closed by a door, for insertion and removal of articles of goods to be carried, and said compartment may be provided or not with a rumble seat 5, accordingly as said compartment is designed to be used or not as a passenger carrying compartment. At a suitable point in rear of the front entrance to the compartment 3 are reinforcing and supporting posts or uprights 6, and disposed in the space between these uprights 6 and the front entranceway 7 to said compartment 3 is an arched or inverted U-shaped sheet metal partition 8 forming a horizontal transverse receiving chamber 9 between its top 10 and the overlying portion of the deck 4, which chamber is provided with vertical extensions 11 disposed between its sides 12 and the lower portions of the posts 6. A wall 13 closes the space between the top 10 of the partition 8 and the deck 4, and separates the horizontal transverse portion of the chamber 9 from the compartment 3, the chamber 9 and its extensions 11 forming a substantially inverted U-shaped storage receptacle for the folded top when the latter is stored in the compartment 3, the body of the top being received in the chamber 9 and the sides of the top in its vertical extensions 11.

Arranged within the compartment 2 is a seat 14 having a back rest 15. This back rest 15 is hinged, as at 16, to the frame of the seat 14 so as to allow it to be swung forward to the dotted line position shown in Fig. 1 or swung rearwardly to the full line position shown therein. When in the full line position the seat back 15 covers and closes the front entranceway 7 of the compartment 3, and when in the dotted line position said seat back uncovers or exposes such entranceway of said compartment for the purpose of enabling the disappearing top to be moved into or out of said compartment, as hereinafter described. The seat back 15 has its upper edge arranged to normally come flush with the portion of the rail or molding 17 extending across the front edge of the deck 4 and abuts snugly thereagainst when the compartment 3 is closed, and said seat back may be secured in closed position by any suitable fastening means, or it may be tilted rearwardly to a sufficiently inclined position to be maintained in such position by gravity to normally keep the compartment 3 closed.

The top 18 may in general be of any one of a number of constructions in common use, with the exception of such features of construction as are provided for the purpose of mounting it in accordance with my invention. As an example, the top 11 may be an ordinary one-man type of folding top adapted to be supported at its lower rear edge upon the vehicle body and to be detachedly secured when in extended position at its forward edge to the windshield 19. The particular type of top 18 shown is adapted when released from connection with the windshield to fold alternately in opposite directions, or in zig-zag or accordion fashion, so that the normally horizontal forward horizontal portion of the top will fold parallel with the normally upright rear portion thereof. The frame of the folding top includes the front bow 20, the rear bow 21, which, for distinguishing purposes, may be called the upper rear bow, the intermediate bow 22, pivoted to the side arms of the bow 21, and a system of folding braces 23 of any suitable or approved type connecting the bows 20 and 22 so as to adapt the top to be extended and folded in the manner described.

In addition to the frame bows 20, 21 and 22, I provide a lower rear frame bow 24 which, like the frame bows 20, 21 and 22 is substantially U-shaped, and so formed that its body portion and arms are respectively adapted to conform to and rest upon the rear and side portions of the rail 17 when the top is in open or operative position. This bow 24 extends through a hem or pocket 25 formed by two plies of the cover fabric adjacent the lower edge thereof, and it is designed and adapted to form a weighted lower frame member or holder for the rear portion of the top cover to hold such portion properly stretched when in open condition over the other portions of the top frame, and to keep the lower edge of the cover in contact with or anchored down against the rail 17, so as to adapt the lower edges of the back and sides of the cover to snugly engage the upper edges of the portion of the body surrounding the seat 14 and to keep the top down and hold it from upward displacement under jolts, jars and wind pressure. This frame member or bow 24 further serves in conjunction with the bow 21 as a means for supporting the top from its swinging carrier frame, whereby the top is mounted on the vehicle body for a disappearing action. The shape of the bow 24 is such as to give an outward bulge or convex curvature to the outer side of the hem 25, whereby it is adapted to form a water-shedding surface along the bottom edge of the top. For the purpose of rendering more effective and increasing the efficiency of this water-shedding action, the plies of material of which the hem or pocket 25 is formed are continued and united for a distance below the hem to provide a joint covering or water-shedding flap 27, which is stiff enough to maintain its position and which is adapted to overlie the outer face of the rail or molding 17 and provide a simple, reliable and efficient form of joint closure to prevent the entrance of rain, snow and sleet at this point.

The forward ends of the arms of the bow 24 are hingedly connected, as at 28, to the forward ends of the arms of the bow 21 and to the forward ends of link arms or bars 29 which, in the open position of the top, are adapted to lie inside and parallel with the said arms of the bow 24. These link arms or bars 29 have curved rear ends which are jointed as at 30, to the free ends of the arms 31 of a swinging carrier frame. This frame comprises the arms 31 in question and a horizontal transverse rock shaft 32 from which said arms project at right angles to the shaft and in planes parallel to each other. The ends of this shaft 32 are journaled in bearings in the posts or uprights 6 so as to adapt the shaft to rock through a suitable arc, such as to enable the arms 31 to swing forwardly and upwardly to the full line position and downwardly and rearwardly to the dotted line position shown in Fig. 1. On the shaft 32 adjacent to the respective arms 31 are coiled springs 33, each having one end connected with the partition 8 or some other fixed part of the vehicle and its other end engaging and bearing upon the adjacent arm 31 to normally press said arm upwardly and forwardly to the full line position shown in Fig. 1, such springs accordingly acting to assist in overcoming the weight of the top and making easier the operation of withdrawing and raising the top for use. It will thus be understood that the top is connected by the swinging links 29 to a swinging carrier frame the arms 31 of which are normally held in raised or top lifting position by the springs 33, the pressure of which springs is overcome by the weight of the folded top in the operation of moving the latter downward for a storage action, the springs 33 in this action, however, giving sufficient resistance to check the descent of the top and prevent the top from violently dropping or slamming.

In order to further provide for the holding of the raised top down upon the vehicle, so as to ensure its firmness and stability in this position, and to prevent it from being possibly lifted and displaced by gusts of wind, I provide locking means coacting with the bow 24 to secure the body in raised position. To this end, I provide the forward end of each arm of the bow 24 with a locking hook or projection 34 which normally, or in the raised position of the top, projects downwardly into a hollow keeper member 35 through a slot 36 in the top wall of said keeper member for engagement with a horizontal transverse locking pin 37 in said keeper. The keepers 35 are disposed flush with and between the forward ends of the sides of the rail 17 and the rear edges of the door openings in the sides of the car, and the hooks 34 are adapted to engage with the pins 37 when the bow 24 is swung downwardly to rest upon the rail, thereby locking the forward ends of the arms of bow 24 and the forward ends of the bow 21 and attached parts of the top frame from upward movement and displacement. These hooks may be disengaged from the pins 37 by tilting the bow 24 upwardly and forwardly in an obvious manner, and in order to prevent such tilting, when the top is in raised position, I provide locking members comprising spring metal plates or strips 38 hinged or pivoted, as at 39, to the body of the bow adjacent to the side arms thereof intermediate of their length, each spring metal locking plate or strip 38 having at its lower end a locking pin or stud 40 to engage a notch or slotted keeper 41 fixed in the rail 17, the upper ends of the strip 38 projecting above the bow and terminating in eyes 42 engaging the lower ends of straps 43 which are fastened at their upper ends to the body of the bow 21. The arrangement of the lower ends or arms of the spring locking members 38 is such that when the bow 24 is brought to rest on the rail 17 in setting up the top the studs 40 will move toward the keeper plates 41 and snap into engagement with the keeper openings therein. The arrangement of the upper ends or arms of the spring locking members 38 is such that when the top is drawn forward and fastened to the windshield 19 a pull or tension will be exerted on the straps 43 which, because of the angular arrangement of the upper arms of the fastening member 38, will effect a forward movement of said arms and a rearward movement of the lower arms of said members, whereby the studs 40 of the latter will be positively forced into locking engagement with the keepers 41 and maintained in such engagement as long as the top is in raised position. The keepers and lower ends of the locking members 38 are, furthermore, so disposed as to be engaged by the seat back 15 when the latter is in normal position in which it closes the entranceway 7 to the compartment 3, thereby holding the locking ends of the locking members 38 positively in locking position and against any possibility of casual disengagement while the seat is in service or in such normal position and until the seat is positively moved forward to expose the entranceway 7.

Fig. 1 shows in full lines the folding top in unfolded and raised position and in dotted lines the folding top in folded position and swung downwardly into the forward portion of the storage compartment 3, in which it seats within the U-shaped receptacle formed by the enclosures 9 and 11. When the top is unfolded and in working position, it is held by the engagement of its bow 20 with the windshield and its bow 24 with the vehicle body against any possibility of collapsing or displacement, and, the top being held rigidly at its base to the body by the weighted bow and its fastening connections, and the joint between the vehicle body and rear of the top cover being closed, a stable support for the top and a moisture proof connection between the same and the upper edge of the body around the seat 14 thereof are furnished. When the top is collapsed and stored in the U-shaped receptacle in the compartment 3, all of the folded portions of the top are disposed vertically in compact condition at the front of the compartment 3, and portions only of the links 29 and arms 31 project rearwardly, but these lie close to the side walls of the compartment, so that, while the top is enclosed and protected from dust and injury, it does not interfere in any manner with the storage of goods in said compartment or the use of such compartment by a passenger or passengers occupying the rumble seat 5, and the top entrance to said compartment 3 may be opened and closed in the usual manner without interference from the folded top or its mounting. It will be observed that when the top is so folded a foot or leg receiving space will be formed below the cross bar 10 and between the sides of the arched partition 8, allowing passengers in the compartment 3 to ride in comfort, while separating the top receiving chamber from said space and preventing the folded top from contact with the feet of the passengers.

In the operation of folding the extended top, the forward edge of the top is first disengaged from the windshield 19 and the bow 20 swung upwardly at its forward edge so as to cause the joints between the same and the bow 22 to break downwardly, the said bow and the bracing arms folding V fashion in advance of and parallel with the bow 22, after which the bows 21 and 22 and the bow 24 are folded together so as to lie in parallel planes, which may be done by moving the top rearwardly so that the bows 20, 21 and 22 collapse down upon the bow 24. Before or at the end of this folding operation the seat back 15 is tilted forwardly to uncover the locking ends of latches 38 and the entranceway 7 to compartment 3, and the latches 38 may then be readily released by pressure upon the upper ends thereof since in the collapsing action of the top the tensional pull from the straps 43 is relaxed. The folded top is then tilted upwardly and forwardly to a sufficient degree to withdraw the hooks 34 from engagement with the locking pins 37 and the top then swung downwardly and rearwardly, in which action the links swing down to the dotted line position shown in Fig. 1 and transmit motion to the carrier frame, the arms 31 of which swing down to the dotted line position shown in Fig. 1, thus moving the folded top downward through the entranceway 7 into the receptacle 9—11 in which it stands upright in a collapsed condition. The seat back 15 is then swung back to normal position to close the entranceway 7, whereupon the disappearing top will be covered and concealed from view and the vehicle converted into an open roadster. When the use of the top is again desired, the seat back 15 is moved forwardly, the top grasped and swung outwardly through the entranceway and upwardly in rear of the seat back until it is fully lifted and ready to be extended, which raising movement may be easily effected owing to the manner in which the top and its body are balanced and such action assisted by the springs 33. The top is then opened up and secured at its forward edge to the windshield and the bow 24 locked to the body, after which the seat back 15 is returned to normal position.

From the foregoing description, the construction and mode of operation of my invention will be readily understood, and it will be seen that the invention provides a top of disappearing type that is adapted to be folded and entirely concealed within the body of the vehicle when its use is not desired, and that such top may be folded and stored and withdrawn and extended for use in a simple, easy and convenient manner. In practice, the parts of the top are so constructed and so balanced that the top may be manipulated by a single person from the interior of the vehicle or from either side of the vehicle. By this means the user of the vehicle may employ it as an open car in good weather and use the top in bad weather or at other times desired. When the top is stored in the compartment 3 it will be protected from dirt, dust and the action of the elements and the exterior of the body left clear of the encumbrance of a projecting folded top, with the result of making a much better appearance. It is to be understood that the usual straps for fastening the parts of the collapsed top together may be employed, although their use is not absolutely essential or of advantage except for convenience in raising and lowering the top, since the top receptacle in the compartment 3 in which the top is stored will hold it in collapsed condition. By mounting the seat back 15 in the manner described, and utilizing it as a closure for the compartment 3, and for the other purposes set forth, a convenient means for securing these results is obtained without the use of auxiliary means.

In the case of the application of the invention to a touring car the compartment or holder to receive the folded top may be disposed in rear of the rear seat and the back of said seat may be hinged, like the seat back 15, to cover and uncover or close and unclose the compartment or holder.

While the construction disclosed is preferred, it will, of course, be understood that any type of folding top frame may be employed in connection with the parts of my invention, and that the structure may be otherwise modified within the scope of the appended claims, without departing from the spirit or sacrificing any of the advantages of the invention.

Having thus fully described my invention, I claim:—

1. In a disappearing top for automobiles, an automobile body having a seat compartment and a storage compartment, the latter provided with an entranceway facing the seat compartment, a swinging support in the storage compartment comprising a horizontal transverse rock shaft having arms, and a folding top jointed to said arms of the rock shaft to swing on an arc downwardly and longitudinally of the vehicle through said entranceway into said storage compartment and upwardly and longitudinally of the vehicle through said entranceway out of said storage compartment, the joint connections between the folding top and arms embodying jointed members operative in the swinging movement for causing the top in its first-named arc of motion to swing on said support in another arc so as to shift the folded top from a horizontal position to a vertical position and vice versa.

2. In a disappearing top for automobiles, an automobile body having a seat compartment and a storage compartment, the latter provided with an entranceway facing the seat compartment, a swinging support in the storage compartment having arms, a folding top having a folding frame and a flexible fabric cover and mounted to swing forwardly and rearwardly in a horizontal plane and to respectively unfold and fold in such movements, and links connecting said frame with said arms of the swinging support and operatively coupled to said frame and support to cause the frame to swing downwardly and rearwardly through said entranceway into said compartment and upwardly and forwardly through said entranceway out of said compartment and in such swinging movements to turn from a horizontal position to a vertical position and vice versa.

3. In a disappearing top for automobiles, the combination of an automobile body provided with a seat compartment and a storage compartment, said storage compartment being arranged in rear of and having an entranceway facing said seat compartment, and a folding top mounted on said body by means operating to fold the top and swing it downwardly and rearwardly into the compartment through said entranceway and to swing it upwardly and outwardly from the compartment through the entranceway and to open it in such movement, said means including controlling members arranged within the compartment and controlling members jointing the first-named controlling members with the frame for swinging the top in its downward and rearward and upward and forward movements from a horizontal position to a vertical position and vice versa, and to dispose the folded bottom when in such vertical position adjacent to and immediately in rear of said entranceway.

4. In a disappearing top for automobiles, an automobile body having a seat compartment and a storage compartment, the latter provided with an entranceway facing the seat compartment, a swinging support in the storage compartment having arms, a folding top having a folding frame and a flexible fabric cover and mounted to swing in a horizontal plane in opposite directions longitudinally of the vehicle and to respectively unfold and fold in such movements, and links connecting said frame with said arms of the swinging support and operatively coupled to said frame and support to cause the frame to swing downwardly and upwardly into and out of the seat compartment and through said entranceway into and out of said storage compartment and in such swinging movements to turn from a horizontal position to a vertical position and vice versa.

5. In a disappearing top for automobiles, the combination of an automobile body provided with a normally uncovered seat compartment, a windshield structure in advance thereof and a storage compartment in rear thereof, said storage compartment having at its front an entranceway facing said seat compartment, means movable to cover and uncover said entranceway, and a folding top pivotally mounted on said body at the rear of the seat compartment by means operating to fold the top and swing it downwardly and into the seat compartment and in one direction longitudinally of the vehicle into the storage compartment through said entranceway and to swing it in the opposite direction longitudinally of the vehicle out of the storage compartment through the entranceway and upwardly out of the seat compartment and to open it in such movement, said means including controlling members arranged within the storage compartment and controlling members jointing the first-named controlling members with the frame for swinging the top in its said downward and upward and longitudinal movements from a horizontal position to a vertical position and vice versa, and to dispose the folded bottom when in such vertical position adjacent to and immediately in rear of said entranceway, and means for engaging the top at its forward portion with the windshield structure when in the second-named position.

6. In a disappearing top for automobiles, an automobile body having a seat compartment, a windshield structure in advance thereof and a storage compartment in rear thereof, the latter named compartment being provided with an entranceway in its top and an entranceway at its front facing the first-named compartment, a swinging support in the storage compartment, means movable to cover and uncover the front entranceway, a folding top pivotally mounted on the body between said compartments to swing forwardly and rearwardly in a horizontal plane and to respectively unfold and fold in such movements, and links connecting said frame with said swinging support and operatively coupled to said frame and support to cause the frame to swing downwardly into said seat compartment through said front entranceway into said storage compartment so as to be disposed at the front of the storage compartment immediately in rear of the front entranceway and upwardly through said front entranceway out of said compartments and in such swinging movements to turn from a horizontal position to a vertical position and vice versa, and means for engaging the top at its forward portion with the windshield structure in its unfolded position.

7. In a disappearing top for automobiles, the combination of an automobile body provided with an open-topped front compartment, a windshield structure in advance thereof, an open-topped rear compartment, and a covered storage space between said compartments having an entranceway facing the front compartment, a folding top on said body for covering the front compartment, means pivotally mounting said top on the body between the compartments to swing from a position above into the front compartment and rearwardly through the entranceway into the covered space and reversely from said space through the entranceway into and upwardly out of said front compartment, said means including controlling members arranged within the compartment and controlling members jointing the first-named controlling members with the frame for swinging the top in its downward and upward movements from a horizontal position to a vertical position and vice versa, and to dispose the folded bottom when in such vertical position in such storage space between the compartments, and means for connecting the top when in working position with the windshield structure.

ANTHONY C. VELO.